United States Patent [19]
Hamada et al.

[11] Patent Number: 5,110,882
[45] Date of Patent: May 5, 1992

[54] SILICONE PRESSURE-SENSITIVE ADHESIVE COMPOSITION

[75] Inventors: Yuji Hamada; Ichiro Murakami; Shosaku Sasaki, all of Chiba Prefecture, Japan

[73] Assignee: Dow Corning Toray Silicone Company, Ltd., Tokyo, Japan

[21] Appl. No.: 125,292

[22] Filed: Nov. 25, 1987

[30] Foreign Application Priority Data

Nov. 28, 1986 [JP] Japan .................................. 61-283343

[51] Int. Cl.$^5$ ............................................ C08F 283/00
[52] U.S. Cl. ..................................... 525/478; 528/15; 528/31; 528/32
[58] Field of Search ............................. 528/15, 31, 32; 525/478

[56] References Cited

U.S. PATENT DOCUMENTS

| | | | |
|---|---|---|---|
| 2,676,182 | 4/1954 | Dandt et al. | 528/39 |
| 3,983,298 | 9/1976 | Hahn et al. | 428/355 |
| 4,418,157 | 11/1983 | Modic | 525/477 |

Primary Examiner—Melvin I. Marcus
Attorney, Agent, or Firm—George A. Grindahl; Richard A. Killworth

[57] ABSTRACT

A pressure-sensitive adhesive having an excellent tack and adhesive strength is obtained from a composition which contains an alkenyl group-containing silicone polymer, a tackifying silicone resin having less than one percent hydroxyl content, an organohydrogenpolysiloxne curing agent for the alkenyl group-containing silicone polymer and a platinum-containing catalyst. The composition can be cured to a silicone pressure-sensitive adhesive by heating at relatively low temperatures.

9 Claims, No Drawings

SILICONE PRESSURE-SENSITIVE ADHESIVE COMPOSITION

BACKGROUND OF THE INVENTION

The present invention relates to an addition-reacting silicone pressure-sensitive adhesive composition which cures to give a pressure-sensitive adhesive.

Silicone pressure-sensitive adhesives have an excellent adhesive strength, tack, and cohesive strength, which are the properties required of a pressure-sensitive adhesive. In addition, they also have the heat resistance, cold resistance, and electrical properties, etc., characteristic of silicones, and so are widely used for electric-insulating tape, which must be very reliable, and for various pressure-sensitive products which must be resistant to hot and cold.

In general, organoperoxide-curing compositions (consisting of a mixture of dimethylsiloxane polymer and methylsiloxane resin) are used as silicone pressure sensitive adhesive compositions. A composition which cures by the addition reaction between alkenyl-containing organopolysiloxane and organopolysiloxane having silicon-bonded hydrogen atoms has also been proposed. Refer to Japanese Patent Publication Number 54-37907 (37,907/79).

However, such organoperoxide-curing compositions must be cured by heating at high temperatures, at least 130 degrees Centigrade, in order to convert them into the pressure-sensitive adhesive. As a consequence, they cannot be used with poorly heat-tolerant substrates. At the same time, while the aforementioned addition-curing composition can in fact be cured at lower temperatures than the organoperoxide-curing compositions, the adhesive strength of the former is inferior to that of the latter.

The inventors carried out investigations in order to eliminate these problems residing in the prior art, and the present invention was developed as a consequence.

BRIEF SUMMARY OF THE INVENTION

The object of the present invention is to provide a pressure-sensitive adhesive composition which can be cured at relatively low temperatures into a pressure-sensitive adhesive having an excellent tack and cohesive strength and a high adhesive strength in particular. This object, and others which will become apparent upon consideration of this disclosure and appended claims, are obtained by the present invention which, in brief, is a composition having specified quantities of a lower alkenyl group-terminated polydiorganosiloxane, an organopolysiloxane composed of $R^2{}_3SiO_{\frac{1}{2}}$ units and $SiO_2$ units and containing no more than 1 weight percent hydroxyl groups, an organopolysiloxane having at least 2 silicon-bonded hydrogen atoms in each molecule, and a platinum-containing catalyst. It characteristically can be cured at relatively low temperatures into a pressure-sensitive adhesive having an excellent tack and cohesive strength, and particularly a high adhesive strength.

DETAILED DESCRIPTION OF THE INVENTION

The present invention relates to a silicone pressure-sensitive adhesive composition comprising (A) 30 to 70 weight parts of a polydiorganosiloxane having the general formula $R^1R_2SiO(R_2SiO)_nSiR_2R^1$ wherein each R is a monovalent hydrocarbon group, each $R^1$ is a lower alkenyl group and n is an integer, (B) 70 to 30 weight parts of an organopolysiloxane which is constituted of $R^2{}_3SiO_{\frac{1}{2}}$ units and $SiO_2$ units in a molar ratio in the range of 0.6:1 to 0.9:1, wherein $R^2$ is selected from among alkyl groups, alkenyl groups, and the hydroxyl group, and the methyl group comprises at least 95 mol percent of all $R^2$ groups and which has a silicon-bonded hydroxyl content of no more than 1 weight percent, (C) an organohydrogenpolysiloxane having an average of at least 2 silicon-bonded hydrogen atoms in each molecule, in a quantity sufficient to provide from 1 to 40 silicon-bonded hydrogen atoms per alkenyl group in component (A), and (D) a platinum-containing catalyst in a quantity sufficient to provide 0.1 to 1,000 weight parts platinum for each one million weight parts of the combined quantity of components (A) through (C).

To explain the preceding, component (A) is the principal component of the pressure-sensitive adhesive composition of the present invention, and curing proceeds by its addition-reaction with component (C) under the catalytic activity of component (D).

Component (A) is a polydiorganosiloxane having the general formula $R^1R_2SiO(R_2SiO)_nSiR_2R^1$ which must have an alkenyl group, which is essential to the addition reaction, at both of its molecular terminals. R in the above formula can be any monovalent hydrocarbon group, for example, alkyl groups such as methyl, ethyl, propyl, etc.; alkenyl groups such as vinyl, allyl, propenyl, etc.; and aryl groups such as the phenyl group, etc. R preferably contains from 1 to 6 carbon atoms and methyl is in general a preferred R radical. Particularly when heat resistance is required, the phenyl group and methyl group will be present together. $R^1$ is to be an alkenyl group such as vinyl, allyl, propenyl, etc.; and a lower alkenyl group such as vinyl is preferred.

No specific restriction obtains on the molecular weight of component (A), or on the value of n in the above formula, as long as no adverse effect accrues with respect to the workability of the pressure-sensitive adhesive composition of the present invention in practical applications. In concrete terms, a solventless pressure-sensitive adhesive composition can be prepared when n is an integer such that the viscosity of component (A) is no more than 100,000 centipoise. To prepare a solvent-containing (organic solvent) pressure-sensitive adhesive composition, in terms of the value of n and the molecular weight of component (A), the use is preferred of a polydiorganosiloxane having a viscosity of at least one million centipoise, a so-called silicone gum. When the viscosity of component (A) is greater than 100,000 centipoise but less than 1 million centipoise, a suitable quantity of organic solvent, as will be discussed below, is added.

Alkenyl-terminated polydiorganosiloxanes are well known in the organosilicone art and their syntheses need no further delineation herein. Typically, an alkenyl-containing terminating reactant, such as divinyltetramethyldisiloxane, is equilibrated with a diorganosiloxane reactant, such as octamethylcyclotetrasiloxane, in the presence of an acidic or alkaline catalyst. A phenyl group-containing and/or a vinyl group-containing diorganosiloxane reactant can also be included in the reaction mixture to introduce phenyl and/or vinyl groups into the polymer chain, if desired. Additionally, phenyl groups can be incorporated into the alkenyl group-containing terminating reactant, if desired. The molecular weight of the polydiorganosiloxane can be controlled by use of the appropriate amount of terminating reactant, in the well-known manner.

Component (B) is an organopolysiloxane which is constituted of $R^2{}_3SiO_{\frac{1}{2}}$ units and $SiO_2$ units and is the component which imparts adhesive strength to the cured pressure-sensitive adhesive. In the above formula, $R^2$ is selected from among alkyl groups such as methyl, ethyl, and propyl, etc.; alkenyl groups such as vinyl and allyl, etc.; and the hydroxyl group; and at least 95 mol percent of all groups $R^2$ are to be methyl. Furthermore, in the present invention the total $R^2$ group complement is to contain no more than 0.5 mol percent, and preferably contains 0 mol percent, alkenyl groups.

The molar ratio of $R^2{}_3SiO_{\frac{1}{2}}$ units to $SiO_2$ units must fall within the range of 0.6:1 to 0.9:1. The tackiness is reduced at below 0.6 $R^2{}_3SiO_{\frac{1}{2}}$ units per $SiO_2$ unit, while the cohesive strength is reduced at above 0.9 $R^2{}_3SiO_{\frac{1}{2}}$ units per $SiO_2$ unit. Methods for synthesizing and analyzing such organopolysiloxanes are known.

Component (B) is to contain no more than 1 weight percent silicon-bonded hydroxyl groups based on the total weight of component (B), and preferably contains no more than 0.6 weight percent. A high adhesive strength cannot be obtained when this content of silicon-bonded hydroxyl groups exceeds 1 weight percent. This hydroxyl group content is particularly important in the present invention.

The quantities of components (A) and (B) that are present in the compositions of this invention can range, independently, from 30 to 70 parts by weight each. Thus the weight ratio of component (A) to component (B) can range from about 0.43 to about 2.33. The quantities of components (C) and (D) that are present in the compositions of this invention are dependent upon the quantities of component (A) and components (A)+(B)+(C), respectively, as noted below.

Component (C) is an organohydrogenpolysiloxane having an average of at least 2 silicon-bonded hydrogen atoms in each molecule and functions as a crosslinker for component (A). Curing proceeds by the addition reaction of the silicon-bonded hydrogen atoms in this component with the alkenyl groups in component (A) under the catalytic activity of component (D).

Component (C) can be any of the currently known organohydrogenpolysiloxanes, particularly methylhydrogenpolysiloxanes, having an average of at least two, and preferably three or more, silicon-bonded hydrogen atoms per silicon atom. The molecular structure of this component is not critical and can be cyclic, linear, branched and/or network, as desired. The organic groups in Component (C) can be any monovalent hydrocarbon group free of aliphatic unsaturation, as is well known, such as the general and specific alkyl and aryl groups denoted above for Component (A). For maximum compatibility of Components (A), (B) and (C) the organic groups in each component are preferably the same.

The quantity of component (C) is to be sufficient to provide 1 to 40 silicon-bonded hydrogen atoms per alkenyl group in component (A); a satisfactory cohesive strength cannot be generated when either 40 is exceeded or when less than 1 is present.

Component (D) is a platinum-containing catalyst, and it promotes the addition reaction of component (A) with component (C). Concrete examples here are chloroplatinic acid, chloroplatinic acid-olefin complexes, chloroplatinic acid-vinylsiloxane complexes, and platinum supported on a microparticulate carrier such as alumina.

Component (D) is added in a quantity sufficient to give 0.1 to 1,000 weight parts platinum and preferably 1 to 300 weight parts platinum for each one million weight parts of the combined quantity of components (A) through (C). The crosslinking reaction will be unsatisfactory at below 0.1 weight part, and the cohesive strength will thus be reduced, while exceeding 1,000 weight parts is disadvantageous due to the resulting short use time and high cost.

In addition to components (A) to (D), an appropriate quantity of an organic solvent can be used in the present invention to dissolve components (A) through (D) and provide for ease of application of the pressure-sensitive adhesive composition of the present invention to various substrates. Concrete examples of this component are hydrocarbons, such as toluene, xylene, and mineral spirits; halohydrocarbons, alcohols, esters, ketones and combinations of these solvents.

In addition to components (A) through (D), any of the addition-reaction inhibitors known in the art may be added in the present invention. Concrete examples thereof are 3-methyl-3-pentene-1-yne, 3,5-dimethyl-3-hexene-1-yne and acetylenic alcohols, for example, 3-methyl-1-butyne-3-ol, 3,5-dimethyl-1-hexyne-3-ol, 3-methyl-1-pentyne-3-ol, and phenylbutynol.

Furthermore, the addition of small quantities of supplementary components to the composition of the present invention is permissible. Such supplementary components are, for example, the various antioxidants, pigments, stabilizers, and fillers.

With regard to the substrate in pressure-sensitive products which may be obtained using the pressure-sensitive adhesive composition of the present invention, various materials are useable here, for example, plastic films such as films of polyester, polyolefin, such as polytetrafluoroethylene, or polyimide; paper such as Japanese paper and synthetic paper; textiles; glass wool; and metal foils.

The present invention will be explained in the following using illustrative examples. In the examples, parts=weight parts, and %=weight percent. The properties reported in the examples were measured by the following methods.

Measurement of adhesive strength

The silicone pressure-sensitive adhesive composition was coated in the specified thickness on the substrate, followed by thermal curing. The resulting pressure-sensitive tape was pressed using a 2 kg rubber roller onto stainless steel plate (SUS304) whose surface had been polished in advance with number 280 water-resistant polishing paper. After standing for 1 hour at room temperature, the tape was peeled using a tensile tester (Tensilon from Toyo-Baldwin Kabushiki Kaisha) at a rate of 0.3 m/minute in order to measure the adhesive strength, which is expressed in units of g/2.5 cm.

Measurement of cohesive strength

Pressure-sensitive tape produced as in the aforementioned measurement of adhesive strength was pressed over an area corresponding to a length of 20 mm and a width of 10 mm using a 2 kg rubber roller onto stainless steel plate (SUS304) whose surface had been polished in advance with number 280 water-resistant polishing paper. A 500 g load was applied to the lower end of the pressure-sensitive tape, and this was suspended in an oven at 100 degrees Centigrade for 2 hours. The slippage was measured using a viewing microscope, and is expressed in mm.

Measurement of the ball tack

Pressure-sensitive tape produced as in the measurement of adhesive strength was placed with the tack surface up on a ball tack tester (Tester Sangyo Kabushiki Kaisha) inclined at an angle of 30 degrees. Steel balls of various sizes were rolled down from a 10 cm long runway. The reported value is the diameter, in units of 1/32 inch, of the largest steel ball which came to a halt on a tack surface 10 cm in length.

For example, a reported value of 10 means that a steel ball with a diameter of 10/32 inch was the largest steel ball coming to rest on the tack surface. This measurement was conducted at room temperature.

EXAMPLE 1

55 Parts methylpolysiloxane composed of $(CH_2)_3SiO_{\frac{1}{2}}$ units and $SiO_2$ units in a 0.7:1 molar ratio and having a hydroxyl group-content of 0.5%, 45 parts dimethylvinylsiloxy-terminated polydimethylsiloxane gum having a vinyl group content of 0.02%, 0.2 parts trimethylsiloxy-terminated methylhydrogenpolysiloxane having a viscosity of 20 centipoise and containing 1.6% silicon-bonded hydrogen atoms, and 0.2 parts 3-methyl-1-butyne-3-ol reaction inhibitor were dissolved in 150 parts toluene. The molar ratio of silicon-bonded hydrogen atoms to vinyl groups was 9.6:1 in this mixture. A pressure-sensitive adhesive composition (40% nonvolatiles) was obtained by adding chloroplatinic acid-vinylsiloxane complex to this mixture in an amount sufficient to give 100 ppm platinum based on the combined quantity of the above polysiloxanes.

This composition was coated on 50 micron-thick aluminum foil and heated at 80 degrees Centigrade for 5 minutes to give a 50 micron-thick film after heating. The film-forming performance, adhesive strength, ball tack, and cohesive strength of the obtained aluminum foil-backed pressure- sensitive tape were measured, and these results are reported in Table 1.

For comparison, a pressure-sensitive adhesive composition was produced as above, but using a methylpolysiloxane containing 2.0% hydroxyl groups in place of the above methylpolysiloxane containing 0.5% hydroxyl groups. This composition was evaluated by the same methods, and these results are also reported in Table 1.

According to Table 1, the pressure-sensitive adhesive composition of the present invention was found to have an adhesive strength superior to that of the comparison example.

TABLE 1

| Item Measured | Present Invention | Comparison Example |
| --- | --- | --- |
| Adhesive Strength | 4,300 g/2.5 cm | 3,500 g/2.5 cm |
| Ball Tack | 24 | 24 |
| Cohesive Strength | 0 mm | 2.0 mm |

EXAMPLE 2

50 Parts methylpolysiloxane which is composed of $CH_3)_3SiO_{\frac{1}{2}}$ units and $SiO_2$ units in a 0.7:1 molar ratio and which contains 0.5% hydroxyl groups, 50 parts dimethylvinylsiloxy-terminated polydimethylsiloxane having a viscosity of 40,000 centipoise, 0.4 parts trimethylsiloxy-terminated dimethylsiloxane-methylhydrogensiloxane copolymer having a viscosity of 10 centipoise (silicon-bonded hydrogen atom: silicon-bonded methyl group molar ratio=1:3), and 0.2 parts 3,5-dimethyl-3-hexene-1-yne were mixed. The molar ratio of silicon-bonded hydrogen atoms to vinyl groups was 2.2:1 in this mixture. A solventless pressure-sensitive adhesive composition was obtained by adding chloroplatinic acid-vinylsiloxane complex to this mixture in an amount sufficient to give 100 ppm platinum based on the combined quantity of the polysiloxanes. This was coated to give a thickness of 50 microns on 50 micron aluminum foil, and was then cured at 100 degrees Centigrade for 3 minutes. The properties of the obtained aluminum-backed pressure-sensitive tape were evaluated, and these results are reported in Table 2.

For comparison, a pressure-sensitive adhesive composition was prepared from the same components as above, with the exception that methylpolysiloxane containing 1.8% hydroxyl groups was used in place of the methylpolysiloxane containing 0.5% hydroxyl groups. This composition was evaluated by the same methods as above, and these results are also reported in Table 2.

TABLE 2

| Item Measured | Present Invention | Comparison Example |
| --- | --- | --- |
| Adhesive Strength | 3,500 g/2.5 cm | 3,000 g/2.5 cm |
| Ball Tack | 30 | 30 |
| Cohesive Strength | 0.20 mm | 0.20 mm |

EXAMPLE 3

The pressure-sensitive adhesive composition of Example 1 was prepared except that 0.4 parts of the same methylhydrogen polysiloxane was employed wherein the molar ratio of silicon-bonded hydrogen atoms to vinyl groups was 19.2:1. This composition was evaluated by the same methods as above and the results are reported in Table 3.

EXAMPLE 4

The pressure-sensitive adhesive composition of Example 1 was prepared except that 1.2 parts of trimethylsiloxy-terminated dimethylsiloxane-methylhydrogensiloxane copolymer was employed instead of the 0.2 parts of methylhydrogenpolysilixane, wherein the molar ratio of silicon-bonded hydrogen atoms to vinyl groups was 28.8:1. This composition was evaluated by the same methods as above and the results are reported in Table 3.

TABLE 3

| Item Measured | Example 3 | Example 4 |
| --- | --- | --- |
| Adhesive Strength | 4,300 g/2.5 cm | 3,500 g/2.5 cm |
| Ball Tack | 24 | 32 |
| Cohesive Strength | 0 mm | 0.8 mm |

EFFECTS OF THE INVENTION

Because the silicone pressure-sensitive adhesive composition of the present invention is composed of specified quantities of (A) lower alkenyl group-terminated polydiorganosiloxane. (B) organopolysiloxane composed of $R^2_3SiO_{\frac{1}{2}}$ units and $SiO_2$ units and containing no more than 1 weight percent hydroxyl groups, (C) organopolysiloxane having at least 2 silicon-bonded hydrogen atoms in each molecule, and (D) a platinum-containing catalyst, it characteristically can be cured at relatively low temperatures into a pressure-sensitive adhesive having an excellent tack and cohesive strength, and particularly a high adhesive strength.

That which is claimed is:

1. A silicone pressure-sensitive adhesive composition comprising
   (A) 30 to 70 weight parts of a polydiorganosiloxane having the general formula $R^1R_2SiO(R_2SiO)_n\text{-}SiR_2R^1$ wherein each R is a monovalent hydrocarbon group, each $R^1$ is a lower alkenyl group and n is an integer.
   (B) 70 to 30 weight parts of an organopolysiloxane which is constituted of $R^2{}_3SiO_{\frac{1}{2}}$ units and $SiO_2$ units in a molar ratio in the range of 0.6:1 to 0.9:1, wherein $R^2$ is selected from the group consisting of alkyl groups, alkenyl groups, and the hydroxyl group, and the methyl group comprises at least 95 mol percent of all $R^2$ groups and which has a silicon-bonded hydroxyl content of no more than 1 weight percent,
   (C) an organohydrogenpolysiloxane having an average of at least 2 silicon-bonded hydrogen atoms in each molecule, in a quantity sufficient to provide from 1 to 40 silicon-bonded hydrogen atoms per alkenyl group in component (A), and
   (D) a platinum-containing catalyst in a quantity sufficient to provide 0.1 to 1,000 weight parts platinum for each one million weight parts of the combined quantity of components (A) through (C).

2. A silicone pressure-sensitive adhesive composition in accordance with claim 1 further comprising at least one addition-reaction inhibitor.

3. A silicone pressure-sensitive adhesive composition in accordance with claim 1 further comprising at least one solvent for components (A) through (D).

4. A silicone pressure-sensitive adhesive composition in accordance with claim 1 wherein Component (B) has a silicon-bonded hydroxyl content of no more than 0.6 weight percent.

5. A silicone pressure-sensitive adhesive composition in accordance with claim 1 wherein $R^1$ denotes the vinyl group, R is selected from the group consisting of methyl, phenyl and vinyl, $R^2$ denotes the methyl group and the organic groups of the organohydrogenpolysiloxane are methyl groups.

6. A silicone pressure-sensitive adhesive composition in accordance with claim 5 wherein the polydiorganosiloxane is a dimethylvinylsiloxy-terminated polydimethylsiloxane and the organohydrogenpolysiloxane is selected from the group consisting of trimethylsiloxy-terminated methylhydrogen-polysiloxanes and trimethylsiloxy-terminated dimethylsiloxane-methylhydrogensiloxane copolymers.

7. A silicone pressure-sensitive adhesive composition in accordance with claim 5 further comprising at least one addition-reaction inhibitor.

8. A silicone pressure-sensitive adhesive composition in accordance with claim 5 further comprising at least one solvent for components (A) through (D).

9. A silicone pressure-sensitive adhesive composition in accordance with claim 5 wherein Component (B) has a silicon-bonded hydroxyl content of no more than 0.6 weight percent.

* * * * *